(12) United States Patent
Kumar et al.

(10) Patent No.: US 9,148,670 B2
(45) Date of Patent: Sep. 29, 2015

(54) MULTI-CORE DECOMPRESSION OF BLOCK CODED VIDEO DATA

(75) Inventors: Atul Kumar, New Delhi (IN); Ankush Jain, Indore (IN); Rituja Srivastava, Greater Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 949 days.

(21) Appl. No.: 13/306,983

(22) Filed: Nov. 30, 2011

(65) Prior Publication Data

US 2013/0136188 A1 May 30, 2013

(51) Int. Cl.
| | |
|---|---|
| H04N 19/436 | (2014.01) |
| H04N 19/44 | (2014.01) |
| H04N 19/61 | (2014.01) |
| H04N 19/65 | (2014.01) |
| H04N 19/66 | (2014.01) |
| G06F 11/16 | (2006.01) |
| G06F 11/20 | (2006.01) |

(52) U.S. Cl.
CPC ............. *H04N 19/436* (2014.11); *H04N 19/44* (2014.11); *H04N 19/61* (2014.11); *H04N 19/65* (2014.11); *G06F 11/1608* (2013.01); *G06F 11/1629* (2013.01); *G06F 11/1658* (2013.01); *G06F 11/1687* (2013.01); *G06F 11/202* (2013.01); *H04N 19/66* (2014.11)

(58) Field of Classification Search
CPC ............. G06F 11/079; G06F 11/3006; G06F 11/0709; G06F 11/2002; G06F 11/3466; G06F 11/1412; G06F 11/0793; G06F 11/3433; G06F 9/505; G06F 9/5083; G06F 9/3822; G06F 9/3885; G06F 9/3887; G06F 9/3861; H04N 19/436; H04N 19/44; H04N 19/86; H04N 19/895; H04N 21/4425; G06T 15/005; G06T 1/00; H03M 7/30

See application file for complete search history.

(56) References Cited

U.S. PATENT DOCUMENTS

| | | | |
|---|---|---|---|
| 5,442,400 A * | 8/1995 | Sun et al. ................ | 375/240.15 |
| 5,768,527 A * | 6/1998 | Zhu et al. ................ | 709/231 |
| 7,460,725 B2 | 12/2008 | Malladi | |
| 7,716,521 B1 * | 5/2010 | Donahue et al. ........ | 714/11 |
| 7,773,004 B2 | 8/2010 | Xiao | |
| 7,796,061 B2 | 9/2010 | Kee | |
| 7,830,964 B2 | 11/2010 | Winger | |
| 8,036,517 B2 | 10/2011 | Smith | |
| 2002/0031188 A1 * | 3/2002 | Negishi et al. ........... | 375/240.26 |
| 2003/0182351 A1 * | 9/2003 | Dawkins et al. ......... | 709/102 |
| 2003/0189982 A1 * | 10/2003 | MacInnis .................. | 375/240.24 |
| 2004/0258162 A1 | 12/2004 | Gordon | |
| 2005/0089238 A1 * | 4/2005 | Fogg et al. .............. | 382/246 |
| 2007/0183491 A1 | 8/2007 | Pearson | |

(Continued)

OTHER PUBLICATIONS

"Novel Approaches to Parallel H.264 Decoder on Symmetric Multicore Systems", Kue-Hwan Sihn; Hyunki Baik; Jong-Tae Kim; Sehyun Bae; Hyo Jung Song; IEEE International Conference on Acoustics, Speech and Signal Processing, 2009. ICASSP 2009.

*Primary Examiner* — Dave Czekaj
*Assistant Examiner* — David N Werner
(74) *Attorney, Agent, or Firm* — Charles Bergere (57) ABSTRACT

Apparatus for and a method of decompression of block coded video data in a multi-core processor. The processor cores decode respective coded groups of blocks of video data independently, in parallel and deblock respective decoded groups of blocks of video data independently and in parallel with the decode operations and with other deblock operations.

18 Claims, 5 Drawing Sheets

(56) References Cited

U.S. PATENT DOCUMENTS

| | | | |
|---|---|---|---|
| 2007/0297501 A1* | 12/2007 | Hussain et al. | 375/240 |
| 2008/0094506 A1* | 4/2008 | MacInnis et al. | 348/453 |
| 2008/0310555 A1* | 12/2008 | Kee | 375/340 |
| 2009/0034627 A1* | 2/2009 | Rodriguez et al. | 375/240.26 |
| 2009/0109988 A1* | 4/2009 | Musunuri et al. | 370/412 |
| 2009/0122867 A1* | 5/2009 | Mauchly et al. | 375/240.16 |
| 2009/0304068 A1 | 12/2009 | Pandit | |
| 2009/0304078 A1 | 12/2009 | Yuasa | |
| 2009/0304086 A1 | 12/2009 | Shi | |
| 2010/0104006 A1 | 4/2010 | Taylor | |
| 2010/0166081 A1* | 7/2010 | Onoye et al. | 375/240.25 |
| 2011/0122944 A1 | 5/2011 | Gupta | |
| 2011/0150075 A1 | 6/2011 | Pearson | |
| 2011/0188570 A1* | 8/2011 | Matsuzaki | 375/240.12 |
| 2011/0276695 A1* | 11/2011 | Maldaner | 709/226 |

\* cited by examiner

MULTI-CORE DECOMPRESSION OF BLOCK CODED VIDEO DATA

BACKGROUND OF THE INVENTION

The present invention is directed to video data decoding and, more particularly, to an apparatus for and a method of multi-core decompression of block coded video data.

Video compression is the reduction of the quantity of data used to represent digital video images and includes spatial image compression and temporal motion estimation. Typically, in block coded video compression, blocks of neighboring pixels, often called macro-blocks, are compared and the video compression encoding scheme retains the differences between blocks. Video data may be intra-frame encoded by registering spatial differences within a frame and/or inter-frame encoded by registering temporal differences between frames. Various techniques exist for video compression, such as H.264/MPEG-4 AVC, which is one widely used block-coded motion-compensation-based compression/decompression ('codec') standard.

The greater the degree of compression obtained, the greater the computational load on decompression. Moreover, high definition video and other video formats with increased data content, such as stereoscopic video for example, also increase the computational load of decompression. Multi-core processors may be used, for real-time decompression for example, in which multiple processor cores participate in parallel in decompression processing. However, such multi-core parallel processing has posed issues of load balancing and computational overhead associated with each additional core.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

DETAILED DESCRIPTION OF PREFERRED EMBODIMENTS OF THE INVENTION

The embodiments of the invention described below are applicable to decompressing video data that is block-coded in compliance with the standard H.264/MPEG-4 AVC. The standard H.264/MPEG-4 AVC is based on motion-compensated discrete cosine transform ('DCT') coding. Each picture is compressed by partitioning it as groups of macro-blocks of luma samples and corresponding chroma samples referred to as slices. However, embodiments of the invention are also applicable to other video data coding techniques and standards.

Figure 1:
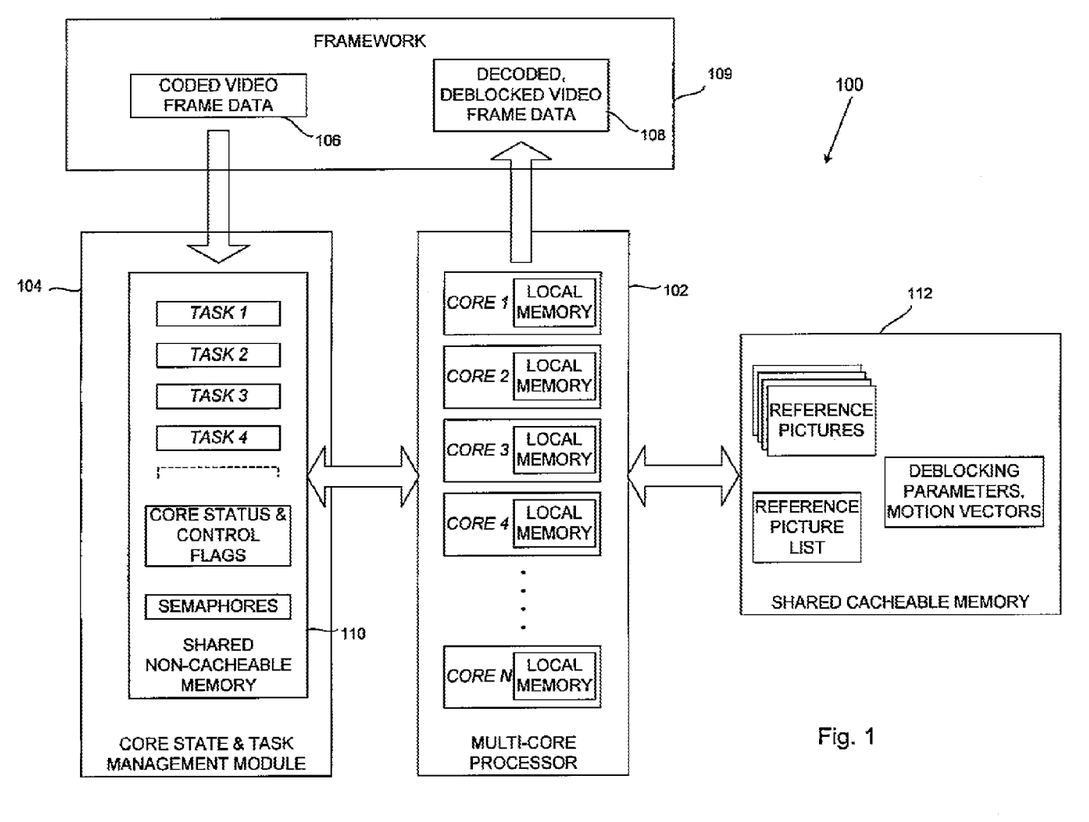
FIG. 1 is a schematic block diagram of an apparatus for multi-core decompression of block coded video data in accordance with one embodiment of the invention, given by way of example.

FIG. 1 illustrates an apparatus 100 for multi-core decompression of block coded video data in accordance with one embodiment of the invention, given by way of example. The apparatus 100 comprises a plurality of processor cores 102 and a task management module 104 for controlling the processor cores to decode respective coded groups of blocks of video data independently in parallel and to deblock respective decoded groups of blocks of video data independently in parallel.

Decoding is the process of recovering detailed picture data for the video blocks from the compressed picture content data and from parameter data common to a set of video blocks. Deblocking is a process applied to decoded video blocks to improve visual quality and prediction performance by smoothing the sharp edges which can form between adjacent video blocks.

If the tasks of the processor cores 102 were partitioned functionally, so that one or more processor cores were dedicated to decoding coded blocks of video data, and one or more other processor cores were dedicated to deblocking decoded blocks, a large amount of data would have to be exchanged between processor cores, posing issues of cache coherency, computational overhead data for the multi-core processor, and high memory requirements.

In the apparatus 100, each of the coded groups of blocks of video data may be a slice of a video frame that is coded separately from other slices and can be decoded independently. In the standard H.264/MPEG-4 AVC, a slice is a sequence of macro-blocks, which are processed in a scan order (left to right and top to bottom in the case of a television picture). The multi-core apparatus 100 can decode a slice that is made up of contiguous macro-blocks.

The task management module 104 is in communication with the processor cores 102 and controls the processor cores 102 to decode respective coded slices of video data independently in parallel. The task management module 104 controls at least one of the processor cores 102 to deblock one or more decoded groups of blocks of video data independently in parallel with at least one other of the processor cores decoding one or more of the coded groups of blocks of video data. The task management module 104 controls the processor cores 102 to decode respective coded groups of blocks with equal weighting, or to deblock respective decoded groups of blocks of video data subject to dependencies. The task management module 104 can allocate a higher priority to deblock tasks than to decode tasks but deblock tasks may be dependent on prior completion of decode tasks. The task management module 104 also can merge a plurality of deblock tasks and control at least one of the processor cores to perform the merged tasks.

The apparatus 100 may include non-cacheable memory 110 which is shared by the processor cores 102 for task management buffers, core states and inter-core communication controlling messages. The apparatus 100 may include shared memory 112 which is cacheable in the processor cores for reference pictures, currently decoded picture, deblocking filter parameters, motion vectors and reference picture list buffers, the processor cores including respective local cacheable memories for current coding parameters and pointers to shared cacheable and shared non-cacheable memories. The processor cores 102 may include respective local cacheable memories for current coding parameters and pointers to shared cacheable and shared non-cacheable memories. One of the processor cores 102 may initialize the reference picture lists and perform memory management control operations for a new video access unit, and the initialized reference picture lists may be copied locally by other processor cores, which re-order the locally copied reference picture lists independently. The processor cores 102 may verify whether a packet received from said task management module 104 is from the current access unit, decode the packet if it is from the current access unit, and signal to the task management module 104 if the packet is not from the current access unit. In order to detect lost packets, the task management module 104 may verify whether more packets are available to be processed, verify whether available packets are from the current access unit and, if one of the cores 102 is in the WAITING state and all the others are in the TERMINATE state, verify whether all packets of the current access unit have been successfully decoded with no packet loss detection.

In more detail, the multi-core processor 102 includes N processor cores CORE 1, CORE 2, CORE 3, CORE 4 to CORE N. The apparatus 100 is scalable, that is to say that the same basic structure of hardware and software is efficient and practical when applied to different numbers of processor cores. Each of the processor cores CORE 1 to CORE N includes a respective local cacheable memory.

The core state and task management module 104 defines the states of the processor cores CORE 1 to CORE N as WAITING, WORKING or TERMINATED. Initially all the cores are placed in the WAITING state. When a task is assigned to a core, its state gets converted to WORKING. If no task is assigned to a core then it remains in, or reverts to the WAITING state and is available for assignment of other tasks. If the process meets exit criteria, for example decompression of a frame being complete or no more data remaining to process, the core state is converted to TERMINATED. The core state and task management module 104 receives compressed video data from a source 106 and the multi-core processor 102 provides decompressed, decoded and deblocked video data to a user module 108, the source 106 and the user module 108 forming part of a framework environment 109.

The core state and task management module 104 includes the memory 110 which is shared by all the cores CORE 1 to CORE N but is non-cacheable, and which is used mainly for task assignment and communication with the cores. The memory 110 is locked and always accessed using semaphores. All memory allocations inside the core state and task management module 104 are done from the shared non-cacheable memory 110. Examples for such allocations are task management buffers, core state and control flags, inter-core communications controlling messages and semaphores.

The apparatus 100 also includes the memory 112 which is shared by all the active processor cores CORE 1 to CORE N and is cacheable. In order to maintain cache coherency among cores, proper memory synchronization operations (flush and invalidate) are performed before accessing these memories for read and/or write into caches. Examples of data stored in the cacheable shared memory 112 are reference pictures, the currently decoded picture, deblocking filter parameters, motion vectors and reference picture list buffers, for example.

The local memories in the cores CORE 1 to CORE N do not require any coherency operations. Examples for such buffers are current coding parameters for any given slice and pointers to the shared cacheable and shared non-cacheable memories 112 and 110. One of the processor cores 102 may initialize the reference picture lists and perform memory management control operations for a new video access unit, and the initialized reference picture lists may be copied locally by other processor cores, which re-order the locally copied reference picture lists independently. The processor cores 102 may verify whether a packet received from said task management module 104 is from the current access unit, decode the packet if it is from the current access unit, and signal to the task management module 104 if the packet is not from the current access unit. In order to detect lost packets, the task management module 104 may verify whether more packets are available to be processed, verify whether available packets are from the current access unit and, if one of the cores 102 is in the WAITING state and all the others are in the TERMINATE state, verify whether all packets of the current access unit have been successfully decoded with no packet loss detection.

The standard H.264/MPEG-4 AVC is applicable to a variety of applications, including broadcasting such as cable, satellite, cable modem, digital subscriber line ('DSL'), terrestrial or interactive broadcasting, or serial storage on optical and magnetic devices, conversational services, video-on-demand or multimedia streaming, and multimedia messaging services, for example. The standard H.264/MPEG-4 AVC provides for a "Network Abstraction Layer" ('NAL'). The NAL formats the Video Coding Layer ('VCL') representation of the video image and provides header information in a manner appropriate for conveyance by a variety of transport layers or storage media. The coded video data is organized into NAL units, each of which is effectively a packet that contains an integer number of bytes. The first byte of each NAL unit is a header byte that contains an indication of the type of data in the NAL unit, and the remaining bytes contain payload data of the type indicated by the header. Non-VCL NAL units may contain any associated additional information such as parameter sets (important header data that can apply to a large number of VCL NAL units) and supplemental data.

Figure 2:
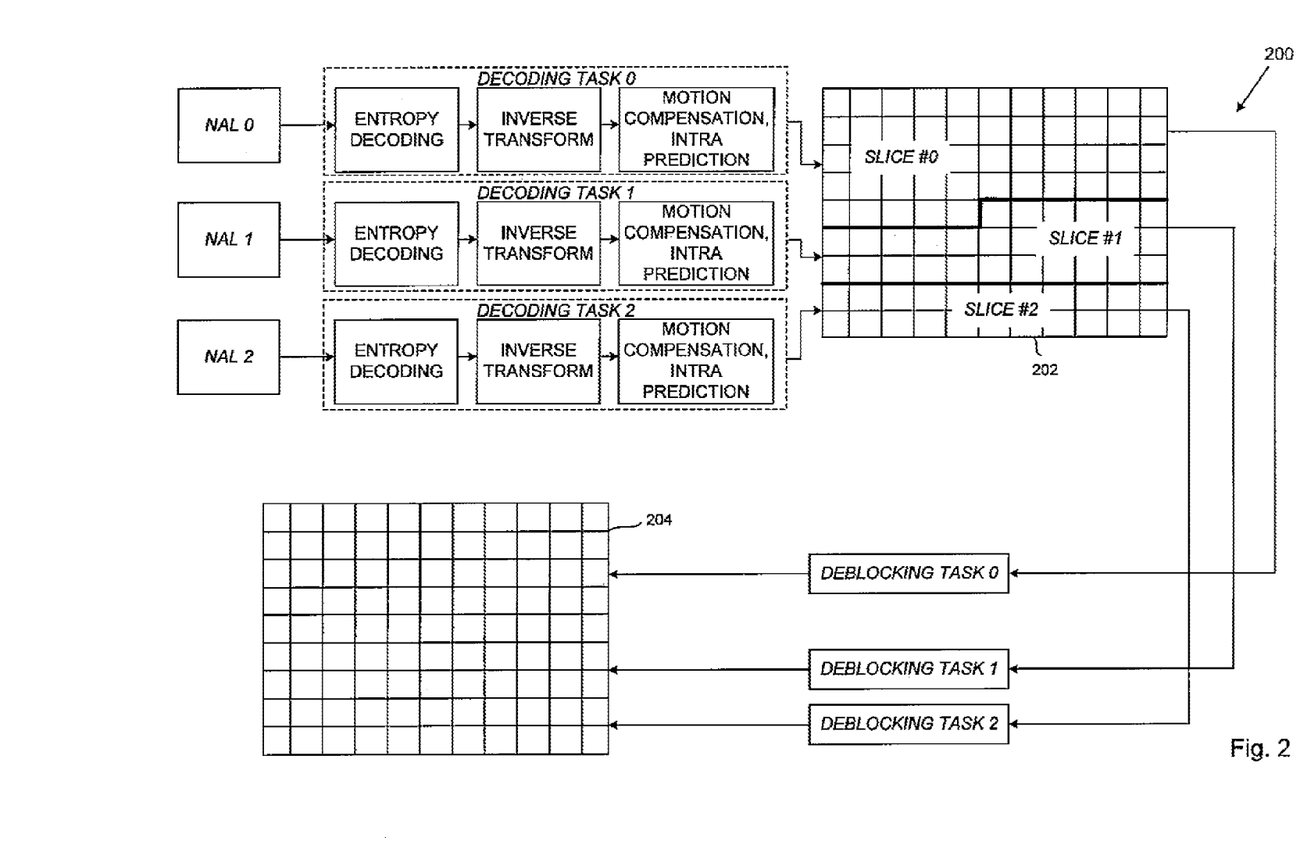
FIG. 2 is a schematic diagram showing tasks performed by the apparatus of FIG. 1.

FIG. 2 illustrates an example 200 of tasks which may be performed by the apparatus 100 in operation. The apparatus 100 receives coded NAL units NAL 0, NAL 1, NAL 2. The core state and task management module 104 assigns decoding tasks DECODING TASK 0, DECODING TASK 1, DECODING TASK 2 to the processor cores CORE 1 to CORE N. Each of the decoding tasks DECODING TASK 0 to DECODING TASK 2 may include entropy decoding, inverse transform, and inter-frame motion compensation and intra-frame prediction, for example. The resulting decoded video data is shown schematically at 202 and comprises decoded slices SLICE #0, SLICE #1, SLICE #2 corresponding to the coded NAL units NAL 0, NAL 1, NAL 2. Each of the slices SLICE #0 to SLICE #2 comprises a respective sequence of macroblocks, an example of the boundaries between the slices being indicated by bold lines.

The core state and task management module 104 also assigns deblocking tasks DEBLOCKING TASK 0, DEBLOCKING TASK 1, DEBLOCKING TASK 2 to the processor cores CORE 1 to CORE N. The deblocking tasks smooth the sharp edges which can form between adjacent video macroblocks, as indicated at 204. The decoding tasks DECODING TASK 0 to DECODING TASK 2 are assigned to the cores CORE 1 to CORE N in parallel with equal weighting, that is to say without dedicating or otherwise specializing one or more cores for this function. The deblocking tasks DEBLOCKING TASK 0 to DEBLOCKING TASK 2 are assigned to any available one or more of the cores CORE 1 to CORE N in parallel with other deblocking tasks and in parallel with the decoding tasks. The multi-core processor 102 may execute multiple decode tasks and multiple deblock tasks in parallel if deblocking across slices is disabled. The multi-core processor 102 may execute multiple decode tasks and single deblock tasks in parallel if deblocking across slices is enabled.

A decode task does not have any dependencies and can be executed at any time, depending upon the task priority. A deblock task has higher priority than a decode task. However, deblocking of the $n^{th}$ row can only start after the deblocking of the $n-1^{th}$ row and after decoding of the $n^{th}$ row. In other words, a deblock task can be executed only if associated dependencies are resolved. The core state and task management module 104 maintains a common task list for decode tasks and deblock tasks. Each of the cores CORE 1 to CORE N can be assigned a task from the shared task list or add a task to the same list. A deblocking task is added to the task list only when all its dependencies are resolved and it is available to deblock. Accordingly, no post-processing is needed. The core state and task management module 104 may also merge deblock tasks. If more than one deblocking task is available in the task list then the core state and task management module 104 merges the deblocking tasks, combining the tasks of deblocking different continuous rows as a single deblocking task which it adds to the task list. This avoids resource conflict and false searching for tasks.

Figure 3:
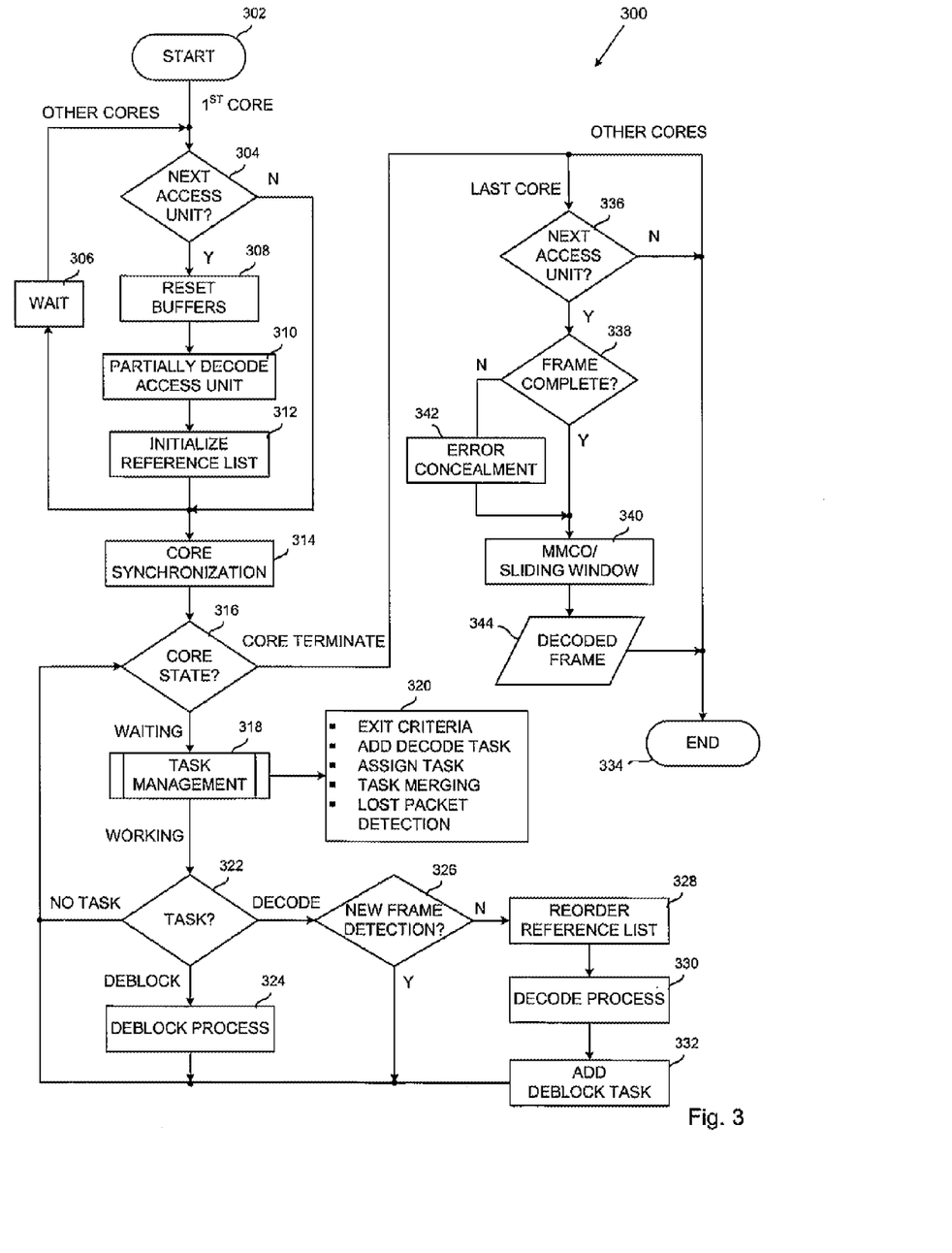
FIG. 3 is a flow chart of a method of multi-core decompression of block coded video data in accordance with one embodiment of the invention, given by way of example.

FIG. 3 illustrates a method 300 of decompression of block coded video data in a multi-core processor comprising a plurality of processor cores in accordance with one embodiment of the invention, given by way of example, and which may be performed by the apparatus 100, for example, or by other apparatus. The method 300 comprises controlling the processor cores to decode respective coded groups of blocks of video data independently in parallel and to deblock respective decoded groups of blocks of video data independently in parallel.

In the method 300, each of the coded groups of blocks of video data may be a slice of a video frame which is coded separately from other slices and the processor cores may decode respective coded slices of video data independently in parallel. At least one of the processor cores may deblock one or more decoded groups of blocks of video data independently in parallel with at least one other of said processor cores decoding one or more of said coded groups of blocks of video data. The processor cores may decode respective coded groups of blocks with equal weighting, or deblock respective decoded groups of blocks of video data subject to dependencies. A plurality of deblock tasks may be merged and at least one of said processor cores may perform the merged tasks.

In the method 300, the processor cores may share a non-cacheable memory for task management buffers, core states and inter-core communication controlling messages. The processor cores may share a memory which is cacheable for reference pictures, currently decoded picture, deblocking filter parameters, motion vectors and reference picture list buffers, the processor cores including respective local cacheable memories for current coding parameters and pointers to shared cacheable and shared non-cacheable memories. One of the processor cores may initialize the reference picture lists and perform memory management control operations for a new video access unit, and the initialized reference picture lists may be copied locally by other processor cores, which re-order the locally copied reference picture lists independently. The processor cores may verify whether a packet received from said task management module is from the current access unit, decode the packet if it is from the current access unit, and signal to said task management module if the packet is not from the current access unit. Detecting lost packets may include verifying whether more packets are available to be processed, verifying whether available packets are from the current access unit and, if one core is in the WAITING state and all the others are in the TERMINATE state, verifying whether all packets of the current access unit have been successfully decoded with no packet loss detection.

In more detail, the method 300 starts at 302 by defining tasks for a first one of the processor cores. At 304, the first core verifies whether a new access unit is starting or not while other cores remain in the WAITING state at 306 until the first core is ready for synchronization. At 304, if no new access unit is starting then the first core does not do any initialization operation. However, if a new access unit is starting at 304, the process resets at 308 all the management data, picture data and parameters which are not relevant to the new access unit. At 310, the process then decodes non-VCL NALs and partially decodes slice headers of a single VCL NAL from the initial NAL units. At 312 one of the processor cores initializes the reference lists and performs memory management control operations for the new video access unit.

The cores are synchronized at 314 and the initialized reference picture lists are copied locally by other processor cores. The process verifies the core states at 316 until the core is put in the TERMINATE state. For those cores which are in the WAITING state, the task management process is engaged in succession at 318. As indicated at 320, the task management process may result in the current core being put in the TERMINATE state if the exit criteria are met, for example decompression of a frame being complete or no more data remaining to process. Otherwise at 318 and 320, a DECODE task may be added to the task list, a task may be assigned to the current core, two or more tasks may be merged in the task list, or the lost packet process may be engaged, for example, which may result in the current core being put in the WORKING state.

At 322, the process depends on the nature of the task assigned to the current core. If the task assigned is DEBLOCK, the deblock process is performed at 324 and the process reverts to core state verification and task management at 316 and 318. If the task assigned is DECODE, the processor core verifies at 326 whether the unit to be processed corresponds to a new access unit (a new frame) and, if not, the reference lists in the local memory of the current core are reordered at 328, the DECODE process is performed at 330, a DEBLOCK task is added to the task list at 332 and the process reverts to core state verification and task management at 316 and 318. The process also reverts to core state verification and task management at 316 and 318 if at 326 the unit to be processed corresponds to a new access unit, and if at 322 the current core no longer has a task to perform.

On-the-fly new frame detection at 326 checks whether a DECODE task belongs to the next access unit or not; and if so raises a next access unit flag which is used at steps 304, 336 and 408 (FIG. 4) for decisions. If the DECODE task belongs to the next access unit, then it is not processed and, the processor core identifies to the task management module and the framework that it relates to a FUTURE NAL which is to be processed in the next access unit, and the process reverts to core state verification and task management at 316 and 318. If the DECODE task belongs to the current access unit, the task is processed and intimated to framework as a FREE NAL, and the process reverts to core state verification and task management at 316 and 318.

If at 316 the process meets the criteria for the TERMINATE state, the process ends at 334 for all cores except for the last one. For the last core at 336, if the next access unit flag set at 326 is found to be FALSE the process for the current access unit also ends for the last core. If at 336 next access unit flag is found to be TRUE then the process verifies at 338 whether frame is complete or incomplete. If the frame is complete, the process proceeds to memory management control operation ('MMCO') or sliding window at 340. If the frame is incomplete, the process identifies the frame locations corresponding to the lost access units (packets) and performs error concealment algorithms at 342 before proceeding to MMCO or sliding window at 340. The decompressed frame is then obtained at 344.

Figure 4:
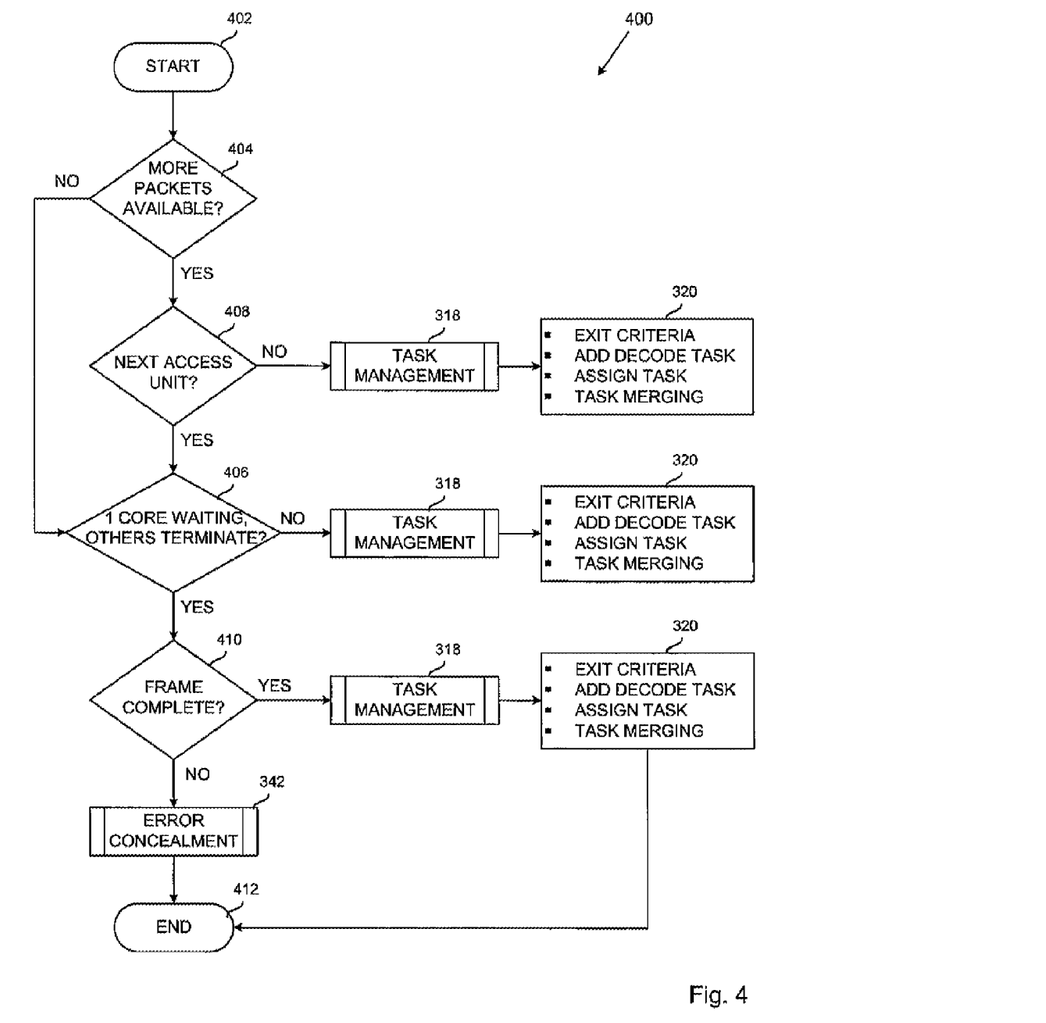
FIG. 4 is a flow chart of a method of detecting and treating lost packets in the multi-core decompression of block coded video data of FIG. 3.

FIG. 4 illustrates in more detail an example of a method 400 to detect lost access units (lost packets) at 320. The method 400 starts at 402 and at 404, the process verifies whether more packets are available to be processed. If not, the process verifies core state at 406 and unless one core is in the WAITING state and all the others are in the TERMINATE state, the process proceeds to task management at 318 so that the other active cores can complete their tasks. If at 404 more packets are available to be processed, the process verifies at 408 whether the next access unit flag is set to TRUE or FALSE at step 326. If at 408 the next access unit flag is found to be FALSE, the process proceeds to task management at 318 to process the packets. If at 408 the next access unit flag is found to be TRUE, the process reverts to core state verification at 406.

If at 406 one core is in the WAITING state and all the others are in the TERMINATE state, the process verifies at 410 whether all macroblocks for the current access unit have been successfully decoded. If at 410 all macroblocks for the current access unit have been successfully decoded with no packet loss detection, the method 400 ends at 412 and the process proceeds to task management at 318 to perform MMCO or sliding window 340. If at 410 successfully decoded macroblocks for the current access unit are incomplete, the process identifies the frame locations corresponding to lost packets and performs error concealment algorithms at 342 and then MMCO or sliding window 340, the method 400 ending at 412.

Figure 5:
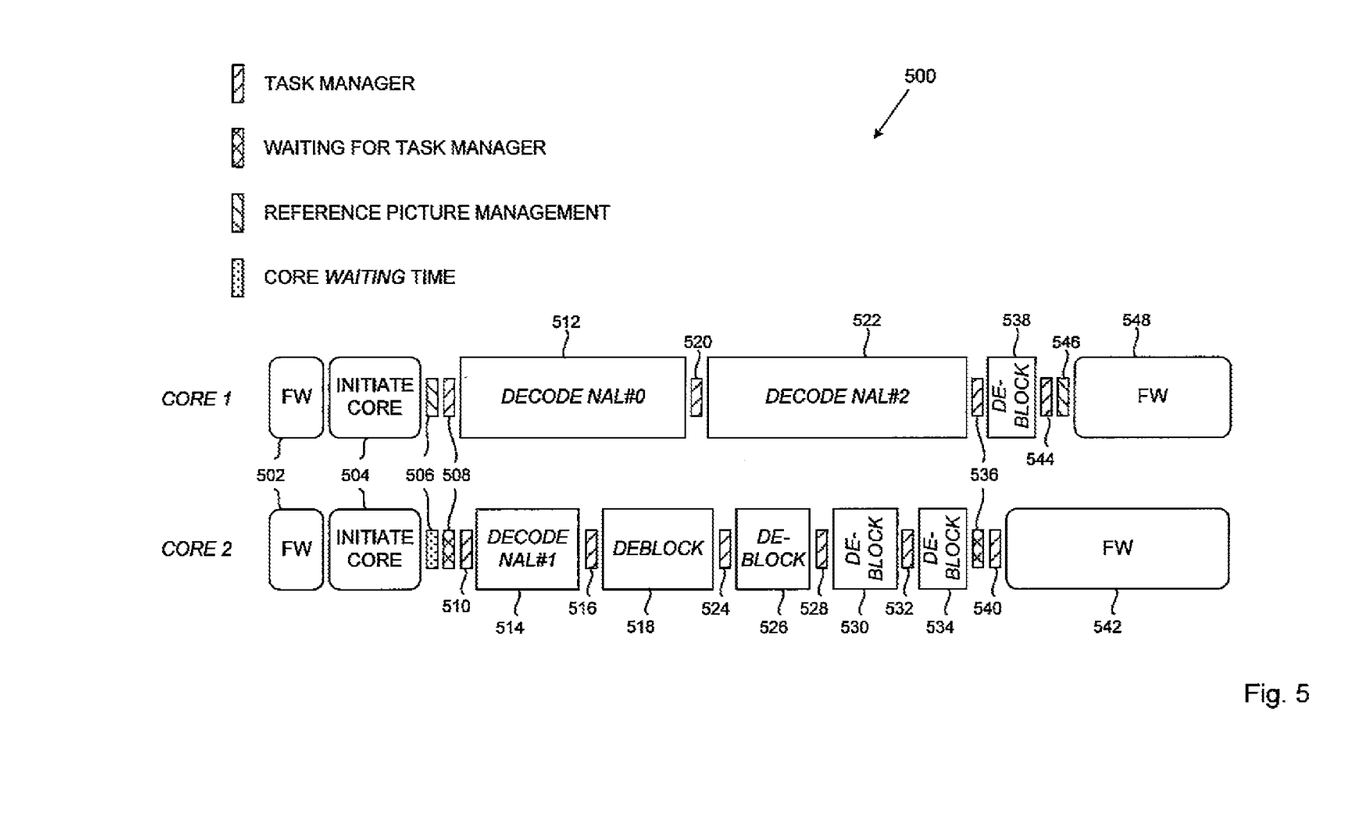
FIG. 5 is a timing diagram showing relative timing of tasks of different cores in the method of FIG. 3.

FIG. 5 illustrates an example 500 of the relative timing of tasks performed in two different cores CORE 1 and CORE 2 during the process 300. Task management activity is shown by forward hatched areas. Time spent by a core waiting for task management activity is shown by cross hatched areas. Reference picture management activity is shown by reverse hatched areas. Core WAITING time is shown by dotted areas.

At 502, both cores CORE 1 and CORE 2 are assigned by the framework environment 109 to be used in decoding. At 504, both cores CORE 1 and CORE 2 are being initialized, and their local memories are being reset. At 506, CORE 1 is engaged in reference picture management and CORE 2 is in the WAITING state. At 508, CORE 1 is being assigned a task by the task manager and CORE 2 is waiting for task management activity. At 510, CORE 2 is being assigned a task by the task manager.

At 512 and 514, cores CORE 1 and CORE 2 are engaged in decoding activity in parallel. CORE 1 is decoding NAL unit #0 and CORE 2 is independently decoding NAL unit #1. At 516, CORE 2 has completed decoding NAL unit #1 and is being assigned a task by the task manager. At 518, CORE 2 is engaged in deblocking activity in parallel with the decoding activity 512 of NAL unit #0 in CORE 1. At 520, CORE 1 is being assigned a task by the task manager and at 522 CORE 1 is decoding NAL unit #2, initially in parallel with the deblocking activity 518 in CORE 2. At 524, CORE 2 has completed the deblocking activity 518 and is being assigned a task by the task manager. At 526, CORE 2 is engaged in deblocking activity in parallel with the decoding activity 522 of NAL unit #2 in CORE 1. Similarly, at 528 to 534, CORE 2 has completed deblocking activities 526 and 530 and is assigned a task by the task manager at 528 and 532. At 526, 530 and 534, CORE 2 is engaged in deblocking activity in parallel with the decoding activity 522 of NAL unit #2 in CORE 1.

At 536, the decoding activity 522 in CORE 1 and the deblocking activity 534 in CORE 2 have been completed, CORE 1 is being assigned a task by the task manager and CORE 2 is waiting for task management activity. At 538, CORE 1 is engaged in deblocking activity. At 540, CORE 2 is being assigned a task by the task manager and at 542 CORE 2 is engaged in framework activity. At 544, CORE 1 has completed the deblocking activity 538 and is being assigned a task by the task manager. At 546, CORE 1 is engaged in reference picture management and at 548 CORE 1 is engaged in framework activity.

The example 500 illustrates how the method 300 enables the decoding tasks to be assigned to any available one or more of the cores in parallel with equal weighting, that is to say without dedicating or otherwise specializing one or more cores for this function. The deblocking tasks may be assigned to any available one or more of the cores in parallel with other deblocking tasks and in parallel with the decoding tasks.

In an example of utilization of the method 300 running in an apparatus 100 on two typical video scenes, the use of a 6-core processor instead of a single core processor reduced the latency from 0.64 seconds to 0.13 seconds for a computational overhead of 2.7% per core for one video sequence, and reduced the latency from 1.49 seconds to 0.32 seconds for a computational overhead of 3.6% per core for the other scene. Load balance between the cores was close to optimal.

The invention may be implemented at least partially in a computer program that runs on a computer system, having code portions for performing steps of a method according to the invention when run on a programmable apparatus, such as a computer system or enabling a programmable apparatus to perform functions of a device or system according to the invention. A computer program is a list of instructions such as a particular application program and/or an operating system. The computer program may include one or more of: a subroutine, a function, a procedure, an object method, an object implementation, an executable application, an applet, a servlet, source code, object code, a shared library/dynamic load library (DLL) and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example, magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Furthermore, those skilled in the art will recognize that boundaries between the above described operations are merely illustrative. Multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may be implemented as soft or code representations of physical circuitry or of logical representations convertible into physical circuitry, such as in a hardware description language of any appropriate type.

In the claims, the word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. If certain measures are recited in mutually different claims, it does not indicate that a combination of these measures cannot be used to advantage.

The invention claimed is:

1. An apparatus for multi-core decompression of block coded video data, comprising:
   a plurality of processor cores; and
   a task management module, connected to said processor cores, that controls said processor cores to decode respective coded groups of blocks of video data independently in parallel and to deblock respective decoded groups of blocks of video data independently in parallel, wherein:
   any of said processor cores can perform decoding and deblocking,
   any of said processor cores can perform both slice decoding and deblocking to reduce decoding latency, and
   multiple decode and multiple deblock tasks are performed in parallel, and
   wherein, in order to detect lost packets, said task management module verifies whether more packets are available to be processed, verifies whether available packets are from a current access unit and, if one core is in a WAITING state and all the other cores are in a TERMINATE state, said task management module verifies whether all packets of the current access unit have been successfully decoded with no packet loss detection.

2. The apparatus of claim 1, wherein each of said coded groups of blocks of video data is a slice of a video frame that is coded separately from other slices of video data and said task management module controls said processor cores to decode respective coded slices of video data independently in parallel.

3. The apparatus of claim 1, wherein said task management module controls at least one of said processor cores to deblock one or more decoded groups of blocks of video data independently in parallel with at least one other of said processor cores decoding one or more of said coded groups of blocks of video data.

4. The apparatus of claim 1, wherein said task management module controls said processor cores to decode respective coded groups of blocks with equal weighting, and to deblock respective decoded groups of blocks of video data subject to dependencies.

5. The apparatus of claim 1, wherein said task management module merges a plurality of deblock tasks and controls at least one of said processor cores to perform the merged tasks.

6. The apparatus of claim 1, further comprising a non-cacheable memory that is shared by said processor cores for task management buffers, core states and inter-core communication controlling messages.

7. The apparatus of claim 1, further comprising a shared memory that is cacheable in said processor cores for reference pictures, currently decoded pictures, deblocking filter parameters, motion vectors and reference picture list buffers, wherein said processor cores include respective local cacheable memories for current coding parameters and pointers to shared cacheable and shared non-cacheable memories.

8. The apparatus of claim 7, wherein one of said processor cores initializes said reference picture lists and performs memory management control operations for a new video access unit, and the initialized reference picture lists are copied locally by the others of said processor cores, which reorder the locally copied reference picture lists independently.

9. The apparatus of claim 1, wherein said processor cores verify whether a packet received from said task management module is from a current access unit, decode the packet if it is from the current access unit, and signal to said task management module if the packet is not from the current access unit.

10. A method of decompression of block coded video data in a multi-core processor comprising a plurality of processor cores, the method comprising:
   controlling said processor cores to decode respective coded groups of blocks of video data independently in parallel; and controlling said processor cores to deblock respective decoded groups of blocks of video data independently in parallel wherein:
any of said processor cores can perform both decoding and deblocking,
any of said processor cores can perform both slice decoding and deblocking to reduce decoding latency, and
multiple decode and multiple deblock tasks are performed in parallel, and wherein detecting lost packets includes verifying whether more packets are available to be processed, verifying whether available packets are from a current access unit and, if one of said cores is in a WAITING state and all the others are in a TERMINATE state, verifying whether all packets of the current access unit have been successfully decoded with no packet loss detection.

11. The method of claim 10, wherein each of said coded groups of blocks of video data is a slice of a video frame that is coded separately from other slices and said processor cores decode respective coded slices of video data independently in parallel.

12. The method of claim 10, wherein at least one of said processor cores deblocks one or more decoded groups of blocks of video data independently in parallel with at least one other of said processor cores decoding one or more of said coded groups of blocks of video data.

13. The method of claim 10, wherein said processor cores decode respective coded groups of blocks with equal weighting, and deblock respective decoded groups of blocks of video data subject to dependencies.

14. The method of claim 10, wherein a plurality of deblock tasks are merged and at least one of said processor cores performs the merged tasks.

15. The method of claim 10, wherein said processor cores share a non-cacheable memory for task management buffers, core states and inter-core communication controlling messages.

16. The method of claim 10, wherein said processor cores share a memory that is cacheable for reference pictures, currently decoded picture, deblocking filter parameters, motion vectors and reference picture list buffers, and wherein said processor cores include respective local cacheable memories for current coding parameters and pointers to shared cacheable and shared non-cacheable memories.

17. The method of claim 16, wherein one of said processor cores initializes said reference picture lists and performs memory management control operations for a new video access unit, and the initialized reference picture lists are copied locally by other processor cores, which re-order the locally copied reference picture lists independently.

18. The method of claim 10, wherein said processor cores verify whether a packet received from said task management module is from a current access unit, decode the packet if it is from the current access unit, and signal to said task management module if the packet is not from the current access unit.

* * * * *